United States Patent
Jones

[11] Patent Number: 5,926,018
[45] Date of Patent: *Jul. 20, 1999

[54] PROXIMITY SWITCH

[75] Inventor: Kim F. Jones, Mantua, Ohio

[73] Assignee: Lubriquip, Inc., Cleveland, Ohio

[*] Notice: This patent is subject to a terminal disclaimer.

[21] Appl. No.: 08/694,218

[22] Filed: Aug. 8, 1996

Related U.S. Application Data

[63] Continuation of application No. 08/275,345, Jul. 15, 1994, Pat. No. 5,565,770.

[51] Int. Cl.$^6$ .................................................. G01B 7/14
[52] U.S. Cl. ............................... 324/207.26; 324/207.22
[58] Field of Search .................. 324/207.2–207.26, 324/207.13; 137/1, 625.34, 554; 184/7.4, 9; 92/5 R; 200/81.9 M

[56] References Cited

U.S. PATENT DOCUMENTS

| | | | |
|---|---|---|---|
| H1191 | 6/1993 | Hutchison et al | 137/625.65 |
| 3,220,375 | 11/1965 | Gruber et al. . | |
| 3,896,280 | 7/1975 | Blake | 200/81.9 M |
| 3,921,760 | 11/1975 | Brownrigg . | |
| 4,107,604 | 8/1978 | Bernier . | |
| 4,312,425 | 1/1982 | Snow et al. . | |
| 4,359,895 | 11/1982 | Wolff et al. . | |
| 4,401,946 | 8/1983 | Klimstra . | |
| 4,419,646 | 12/1983 | Hermle . | |
| 4,445,168 | 4/1984 | Petryszyn . | |
| 4,507,976 | 4/1985 | Banko . | |
| 4,520,902 | 6/1985 | Snow . | |
| 4,572,331 | 2/1986 | Powell et al. . | |
| 4,922,197 | 5/1990 | Juds et al. . | |
| 4,966,041 | 10/1990 | Miyazaki . | |
| 5,002,090 | 3/1991 | Ichikawa et al. . | |
| 5,115,186 | 5/1992 | Reinartz et al. . | |
| 5,244,002 | 9/1993 | Frederick | 137/1 |
| 5,655,770 | 8/1997 | Jones | 324/207.24 |

FOREIGN PATENT DOCUMENTS 2932658  8/1979  Germany .

OTHER PUBLICATIONS

Brochure "Lubriquip Product Specs & Ordering," Published by Houdaille Industries, Inc. 1974, pp. 1–6.
Brochure "Lubriquip Product Specs & Ordering," published by Houdaille Industries, Inc., pp. 1 and 2, Jan. 1984.

*Primary Examiner*—Walter E. Snow
*Attorney, Agent, or Firm*—Hill & Simpson

[57]     ABSTRACT

A magnet sensor or "proximity switch" for sensing reciprocation of for example a spool within a lubrication distributor block. The sensor provides a threaded nozzle for screwing into the block with a bore therethrough. A magnet holder extends out of the nozzle and mounts a magnet thereto recessed inside the housing. The magnet holder is moveable reciprocally by the reciprocating spool. A sensor body is connected to the housing and holds a magnetic sensing element such as a Hall effect sensor adjacent to the housing for sensing the proximity of the magnetic field of the reciprocating magnet.

25 Claims, 1 Drawing Sheet

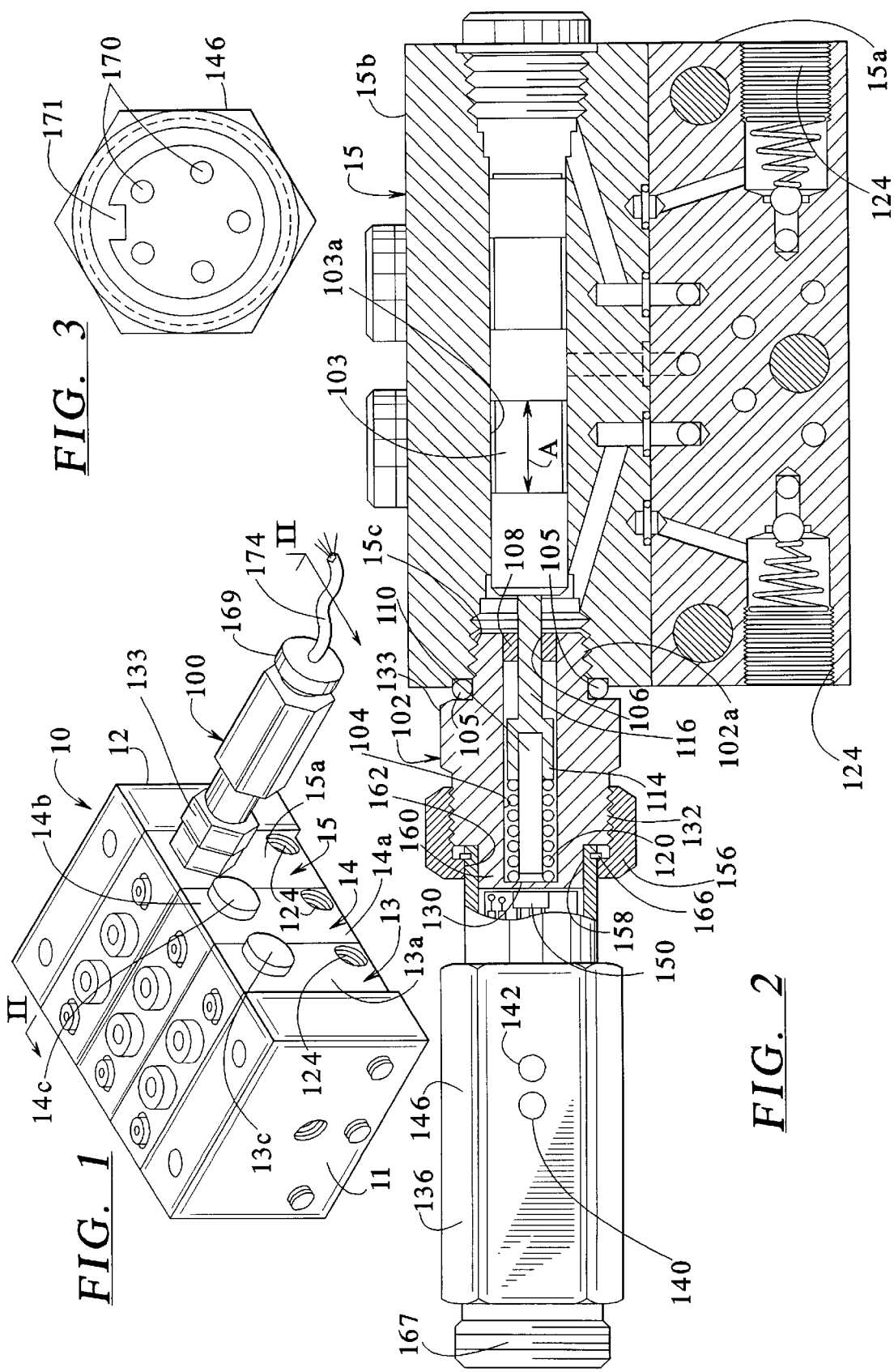

PROXIMITY SWITCH

This is a continuation of application Ser. No. 08/275,345, filed Jul. 15, 1994, now U.S. Pat. No. 5,565,770.

BACKGROUND OF THE INVENTION

The present invention relates to magnetic sensors, and in particular to sensors for cyclic lubricant feeders utilizing reciprocating distributor valves, the sensor being a magnetic sensor for sensing the movement of a reciprocating valve.

A cyclic lubricant distributor valve is disclosed, for example, in U.S. Pat. No. 4,312,425 and U.S. Pat. No. 3,921,760. These distributor valves utilize a block or blocks having a spool bore for holding and guiding a reciprocating spool therein. The spool has cylindrical formations along its length to form various flow paths between formations. A plurality of oil passages are connected into the spool bore along its length. The spool bore and ports form a plurality of oil channels which are activated and deactivated according to the movement of the spool within the spool bore. The distributor valve thus distributes oil in pulses to a plurality of users such as bearings in a machine.

It is desirable for monitoring and/or control to sense the movement of a spool within the spool bore. It is known, such as from U.S. Pat. No. 4,572,331, to provide a rod projecting outward of a distributor block and connected to a reciprocating spool, the rod contacting a micro switch to open and close according to the spool position. However, such a construction requires a packing or seal at the block to seal the reciprocating rod.

SUMMARY OF THE INVENTION

It is an object of the present invention to provide a sensor which is able to detect the presence, or proximity of a spool in a lubricant distribution block. It is an object that the sensor be readily fittable into existing distribution valve blocks. It is an object of the invention that the sensor is self contained in that no packing or seal is required at the block to seal a reciprocating rod.

It is an object of the present invention that the sensor is insensitive to external magnetic influences, both environmental and electrical. It is an object of the invention to provide a sensor which is more insensitive to damage before and after installation.

It is an object of the invention to provide a sensor housing sealed to the block and forming a closed compartment for a magnet, and to provide a sensor body for holding electronics including a sensing element, the sensor body flow isolated from the sensor housing to prevent the possibility of lubricating oil from the block entering the sensor body. It is an object that the sensor housing and sensor body are separate, modular pieces which can be readily assembled together both before and after installation of the sensor to the block.

The objects of the invention are achieved in that a magnet is provided inside a sensor housing, the magnet reciprocatable within the sensor housing. The sensor housing is effectively sealed to the block by threaded engagement thereto compressing a gasket or O-ring seal. The housing is open to the block, particularly to the spool inside the block. The spool moves the magnet reciprocally which activates a sensor element responsive to the magnetic filed of the magnet. A magnet holder is used to hold the magnet within the sensor housing, the holder between the magnet and the distributor block. The holder keeps the magnet steady and protected within the sensor housing. The holder is constructed preferably of stainless steel which will not conduct magnetic fields into the sensor housing. The holder and the sensor housing are adapted such that the holder has two locations of contact or support along its length for stability and guidance as it slides inwardly/outwardly within the housing with the movement of the spool, reducing lateral vibration. The holder material can be selected to be compatible with repetitive impact by the spool, without the necessity of being magnetically charged.

A sensor body is provided for holding a sensing element, such as a Hall effect sensor, and associated electronics, and the sensor body is connected to the sensor housing. The sensor housing provides an enclosed container for the magnet, open only to the block and sealed thereto. A back wall separates an inside of the sensor housing with an inside of the sensor body to block any possible leakage of lubricant from the sensor housing into the sensor body connected thereto. The sensor housing can thus be fashioned to be a high pressure containing vessel reducing the possibility of leakage. The sensor body is readily assembled or disassembled from the sensor housing by a retaining nut and lock ring assembly.

The sensor housing design allows for easy adjustment of indication LEDS located on the sensor body, by loosening the retaining nut, rotating the body, and then re-tightening. This is particularly advantageous when the sensor must be used in confined areas were precise rotary orientation of the LEDS is important.

The sensor provides several additional advantages. The sensor housing is now more durable, easier to assemble, disassemble, install and adjust. The modular separation of sensor housing and sensor body reduces cost of replacing entire assemblies if, for example, only the sensing element is faulty. The sensor body can be replaced "on-line" by separation from the sensor housing. The magnet and holder provide a more stable stroke and increased immunity to vibrational interference. The assembly is resistant to false signals from vibration and impact tests. Susceptibility to external magnetic interference is also greatly reduced.

BRIEF DESCRIPTION OF THE DRAWINGS

FIG. 1 is a perspective view of an oil distributor block using a sensor of the present invention;

FIG. 2 is a cross-sectional view taken generally along line II—II of FIG. 1; and FIG. 3 is a left side view of the sensor of FIG. 2.

DETAILED DESCRIPTION OF THE PREFERRED EMBODIMENTS

Although the sensor of the present invention is advantageous when utilized in a cyclic lubricant distributor, the invention is not limited to such an environment. The invention can be used to sense moving parts in a number of environments, and such are encompassed by the present invention.

FIG. 1 illustrates a cyclic lubricant distributor valve 10 having an inlet block unit 11, an end block unit 12 and a plurality of intermediate block units 13, 14 and 15. Typically the intermediate block units 13, 14 and 15, are identical and each comprise a base member and a separate spool holding member mounted thereto. The base members 13a, 14a, 15a and the spool holding members 13b, 14b, 15b are described in U.S. Pat. No. 4,312,425 which patent is herein incorporated by reference. Within each spool holding member resides a spool which reciprocates in a direction A as shown in FIG. 2.

The intermediate blocks 13 and 14 are shown having end closure plugs 13c, 14c respectively, screwed into threaded openings (not shown). The third intermediate block 15 has a threaded port 15c (shown in FIG. 2) which receives a sensor 100 of the present invention.

FIG. 2 illustrates this sensor 100 of the present invention in more detail. The sensor 100 provides a sensor housing 102 having a threaded nozzle 102a which screws into the port 15c of the block 15 opposite a spool 103 residing within a spool bore 103a of the block 15. The housing 102 provides a longitudinal magnet bore 104 which has an open end 106 at a front end of the nozzle 102a. The housing 102 is sealed to the block 15 by, for example, an O-ring seal 105. Alternately, a flat gasket or other sealing means can be used if necessary. A sleeve insert 108 is fixed at the open end 106 within the bore 104. A cylindrical magnet 110 is located within the magnet bore and held by a magnet holder 112 which has a magnet coupling socket 114 for holding the magnet. The holder has a reduced diameter rod 116 journaled within the sleeve 108 and extendable, at least partially, into the bore 103a of the spool holding member 15b. The rod 116 can make direct contact with the spool 103 or be driven by oil pressure. The spool 103 is slideably held within the bore 103a and as described in U.S. Pat. No. 4,312,425 reciprocates back-and-forth in the direction A to distribute lubricating oil to at least lubricant outlets 124 which are flow connected to various lubricant users, such as bearings throughout a machine (not shown).

The magnet holder 112 is urged by a spring 120 toward the spool 103. As the spool reciprocates, it moves the rod 116 accordingly to the left of FIG. 2 and the rod returns to the right by spring force. The spring 120 is supported against an end wall 130 of the housing, which closes the magnet bore 104. The housing 102 has outside threads 132 at an opposite end to the threaded nozzle 102a, opposite the block 15, and a hexagon formation 133 between the outside threads 132 and the threaded nozzle 102a. The hexagon formation 133 is for wrench engagement for installation and adjustment of the sensor 100.

A sensor body 136 is provided connected to the housing 102 having aperture 140, 142 for location of red and green LED indicators. The sensor body 136 has a hexagonal cross-section 146 for adjustments and handling. The sensor body 136 is hollow for containing electronics. Mounted within the sensor body 136 is a magnet sensing element 150 which can be a Hall effect sensor, an induction sensor or other magnetic sensor. The sensing element reacts to the approaching or receding magnetic field of the magnet to register a proximity of the magnet and thus to register a "count" or a "reciprocation" of the spool 103. The sensing element 150 is directly opposite the wall 130.

To adjust the rotational position of this sensor body 136 with respect to the housing 102 an adjustment nut 156 is provided. The sensor body 136 has an open end 158 which captures a reduced diameter end 160 of the barrel 102. The adjustment nut has a through hole 162 which receives the sensor body 136. The sensor body has a lock ring 166 keyed there to for retaining the sensor body 136 onto the adjustment nut.

The adjustment nut 156, by screwing onto the threads 132, holds the sensor body 136 tightly to the housing 102. To adjust the axial rotary position of the sensor body, for convenient viewing of the LED indicators, the adjustment nut is loosened, the sensor body 136 is selectively turned, and then the adjustment nut is re-tightened.

At a distal end of the sensor body 136 is a threaded connector portion 167 for receiving a cable connector 169 as shown in FIG. 1.

FIG. 3 shows electronic terminal pins 170 exposed and recessed in the connector portion 167 of the sensor body 136 to electrically engage the cable connector 169, to wire the sensor 100 to a controller or monitor (not shown). A tab 171 prevents misconnection of the cable connector 169 to the sensor. A cable 174 is shown in FIG. 1 being connected to the sensor 100 by the connector 169.

Although the present invention has been described with reference to a specific embodiment, those who are skilled in the art will recognize that changes may be made thereto without departing from the scope and spirit of the invention as set forth in the appended claims.

The invention claimed is:

1. A divider valve assembly, comprising:
   a plurality of individual spools reciprocating within a plurality of spool bores having ports at axial ends of the bores closeable by plugs;
   a magnet assembly inserted into one of said ports to be acted upon by one of said spools, said assembly including a magnet held at least partially within a magnet housing;
   a sensor mechanism including a sensor body affixed to the magnet housing at an end of the magnet housing protruding from the port, the magnet housing having an enclosed construction;
   a sensor contained in the sensor body effective to sense movement of the magnet;
   an LED indicator on an extended surface of said sensor body for indicating conditions sensed by the sensor; and
   said sensor body axially rotatably adjustable to the magnet housing.

2. The divider valve assembly according to claim 1, wherein said sensor body is axially rotatably adjustable to the magnet housing.

3. The divider valve assembly according to claim 2, wherein said magnet housing comprises external threads and said sensor body is connectable to said magnet housing by an adjustment nut screwed onto said external threads and capturing a portion of said sensor body onto said magnet housing.

4. For a divider valve assembly having a plurality of individual spool valves, including reciprocating spools guided in spool bores, at least one of the spool bores having a port at an axial end, thereof,
   a spool movement sensor assembly comprising:
      a magnet assembly screwed into said port and having a movement portion that is biased at least partially into said at least one spool bore and that is abuttingly engaged by an axially moving spool reciprocating within said at least one spool bore and having a magnet portion for reciprocating with said movement portion upon engagement by the sensor;
      a magnet housing surrounding said magnet portion and screwed into said port;
      a sensor mechanism held within a sensor body affixed to the magnet housing;
      a sensor contained in the sensor body and effective to sense movement of said magnet portion;
      an LED indicator located on s aid sensor body for indicating conditions sensed by said sensor.

5. The sensor assembly according to claim 4, wherein said sensor body is axially rotatably adjustable to said magnet housing to position said LED indicator at a desired orientation.

6. The sensor assembly according to claim 4, wherein said sensor body includes a cable connection for exporting a signal corresponding to the sensed condition of said sensor.

7. The sensor assembly according to claim 6, wherein said magnet assembly includes a magnet holder mounted to said magnet portion, said magnet holder extending from said magnet housing and providing said movement portion to be directly acted upon by the moving spool.

8. The sensor assembly according to claim 4, wherein said sensor comprises a Hall effect sensor.

9. The sensor assembly according to claim 4, wherein said magnet portion is spring biased toward said spool.

10. The sensor assembly according to claim 4, wherein said magnet housing is substantially cylindrical with a first set of external threads at a first end for screwing into said one port and a second set of external threads on an opposite end, and wherein said sensor body includes a threaded adjustment nut for screwing onto said second set of external threads to hold said sensor body to said magnet housing.

11. The sensor according to claim 10, wherein said sensor body includes a substantially cylindrical portion with an outwardly directed flange and said adjustment nut, when tightened to said magnet housing, clamps said flange to said magnet housing, and when said adjustment nut is loosened said sensor body can be adjusted about its axis to multiple orientations.

12. For a lubrication distribution valve including at least one reciprocating spool guided in a spool bore, the spool bore having a port at an axial end thereof, a spool movement sensor assembly comprising:

a magnet assembly inserted into said port to be abuttingly engaged by said reciprocating spool, including a magnet held at least partially within a magnet housing, a portion of the magnet assembly being biased into the spool bore for engagement by said reciprocating spool;

a sensor mechanism including a sensor body affixed to the magnet housing;

a sensor contained in the sensor body effective to sense movement of the magnet;

an electrically controlled indicator located on an outer surface of said sensor body for indicating a condition sensed by said sensor.

13. The assembly according to claim 12, wherein said magnet housing has an en closed construction.

14. The assembly according to claim 12, wherein said sensor body is axially rotatably adjustable to the magnet housing.

15. The assembly according to claim 12, wherein said magnet housing comprises external threads and said sensor body is connectable to said magnet housing by an adjustment nut screwed onto said external threads and capturing a portion of said sensor body onto said magnet housing.

16. The assembly according to claim 12, wherein said magnet assembly includes a magnet holder mounted to said magnet, said magnet holder extending from said magnet housing said magnet holder to be directly acted upon by the moving spool.

17. The assembly according to claim 12, wherein said indicator comprises an LED indicator.

18. The assembly according to claim 17, wherein said sensor body is axially rotatably adjustable to said magnet housing to position said LED indicator at a desired orientation.

19. The assembly according to claim 12, wherein said indicator comprises a visual indicator.

20. The assembly according to claim 12, wherein said sensor body includes a cable connection f or exporting a signal corresponding to the sensed condition of said sensor.

21. The assembly according to claim 12, wherein said sensor comprises a hall effect sensor.

22. The assembly according to claim 12, wherein said magnet is spring biased toward said spool.

23. The assembly according to claim 12, wherein said magnet housing is substantially cylindrical with a first set of external threads at a first end for screwing into said port and a second set of external threads on an opposite end, and wherein said sensor body includes a threaded adjustment nut for screwing onto said second set of external threads to hold said sensor body to said magnet housing.

24. The assembly according to claim 23, wherein said sensor body includes a substantially cylindrical portion with an outwardly directed flange and said adjustment nut, when tightened to said magnet housing, clamps said flange to said magnet housing, and when said adjustment nut is loosened, said sensor body can be adjusted about its axis to multiple orientations.

25. The assembly according to claim 12, wherein said indicator comprises an illuminated element.

* * * * *